United States Patent [19]

Isamu

[11] Patent Number: 4,472,937
[45] Date of Patent: Sep. 25, 1984

[54] WATER DRIVER POWER SUPPLY SYSTEM

[75] Inventor: Kihata Isamu, Hitachi, Japan

[73] Assignee: Kawaguchi Spring Manufacturing Company, Limited, Kawaguchi, Japan

[21] Appl. No.: 442,048

[22] Filed: Nov. 16, 1982

[30] Foreign Application Priority Data

Dec. 3, 1981 [JP] Japan .................. 56-195026

[51] Int. Cl.³ .................. F03C 1/00; F03G 7/00
[52] U.S. Cl. .................. 60/503; 60/507
[58] Field of Search .................. 60/497–507

[56] References Cited

U.S. PATENT DOCUMENTS

| | | | |
|---|---|---|---|
| 291,340 | 1/1884 | Harvey | 60/503 |
| 939,506 | 11/1909 | Hubmann | 60/503 |
| 999,579 | 8/1911 | Mecham | 60/503 |
| 1,139,995 | 5/1915 | Osterholtz | 60/503 |
| 2,023,821 | 12/1935 | Purnasiri | 60/503 |
| 4,034,565 | 7/1977 | McVeigh | 60/503 |

FOREIGN PATENT DOCUMENTS

| | | |
|---|---|---|
| 197002 | 5/1923 | United Kingdom . |
| 1484721 | 9/1977 | United Kingdom . |
| 2003993 | 6/1978 | United Kingdom . |
| 2004597 | 4/1979 | United Kingdom . |
| 2064665 | 10/1980 | United Kingdom . |
| 1577480 | 10/1980 | United Kingdom . |

*Primary Examiner*—Allen M. Ostrager
*Attorney, Agent, or Firm*—Wenderoth, Lind & Ponack

[57] ABSTRACT

A water driven power system has a cylindrical body with valved water supply and drain ports in the bottom thereof, the valves including valve plates rotatable between valve open and valve closed positions. A float is freely movable up and down between an upper limit position and a lower limit position in the cylindrical body due to buoyancy during supply of water through the supply valve and due to gravity during drainage through the drain valve. The float movement during the time of water supply is converted to rotation and a one-way clutch mechanism supplies the motion to an output mechanism. A valve opening and closing mechanism closes the water supply valve and opens the drain valve at the upper limit position of the float and opens the water supply valve and closes the drain valve at the lower limit position of the float. A linkage is connected to the respective ones of the valve plates and is driven up and down for moving the valve plates in rotation by springs which are compressed and then caused to drive the linkage when the linkage is released.

2 Claims, 14 Drawing Figures

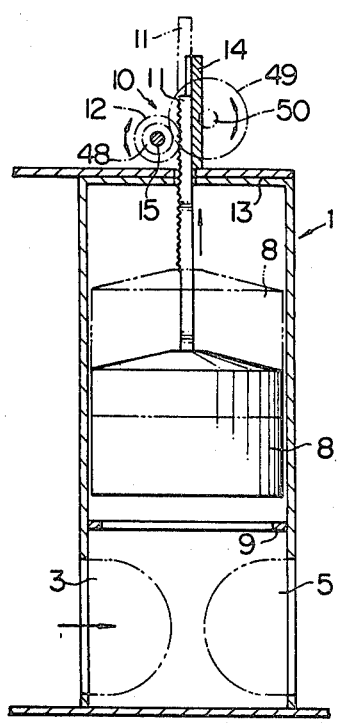
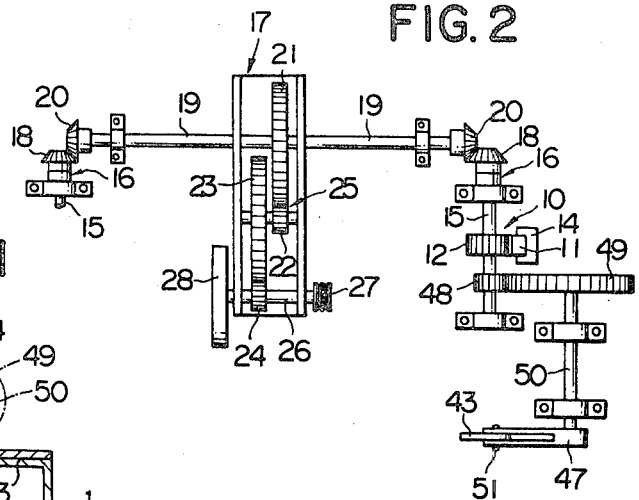
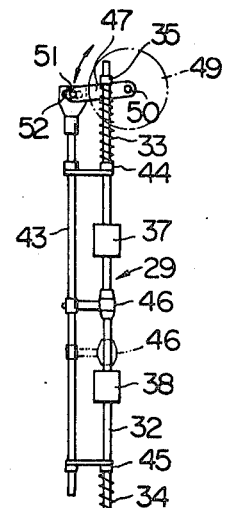
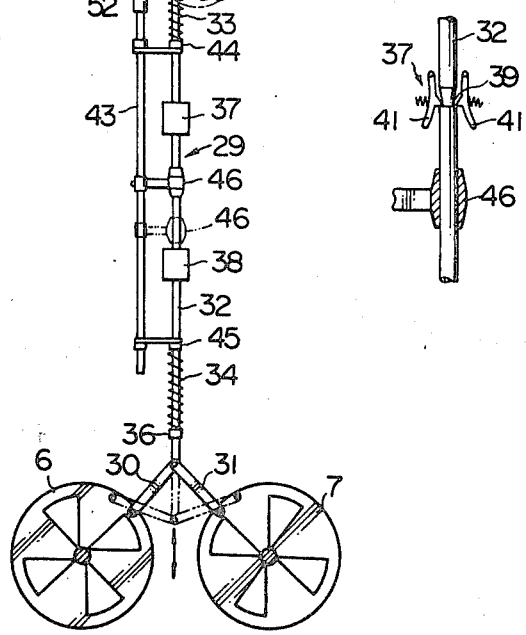

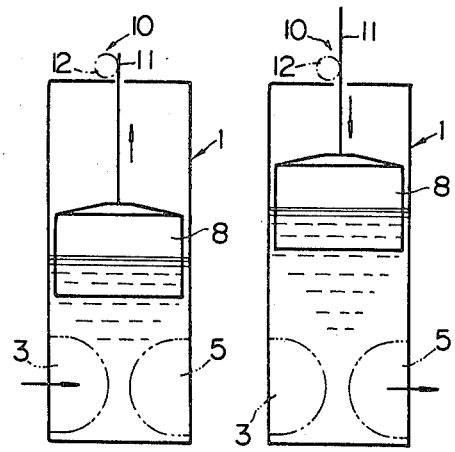
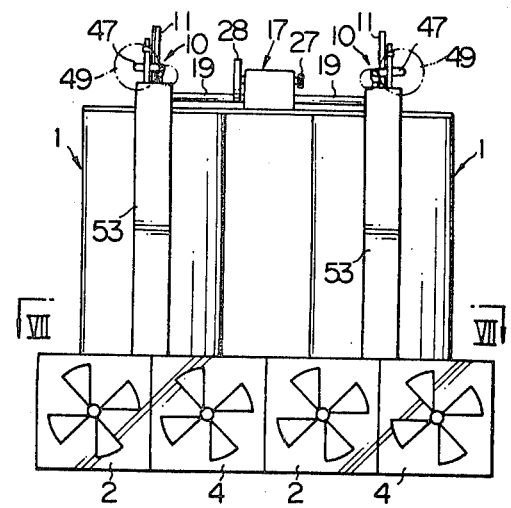
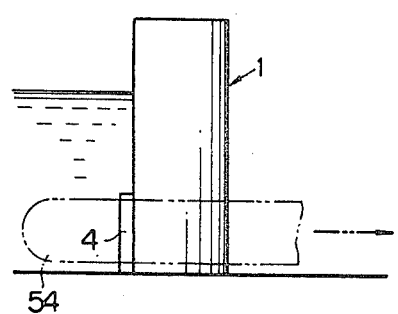
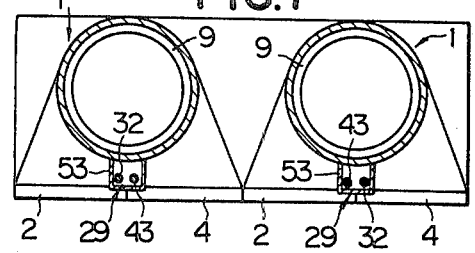
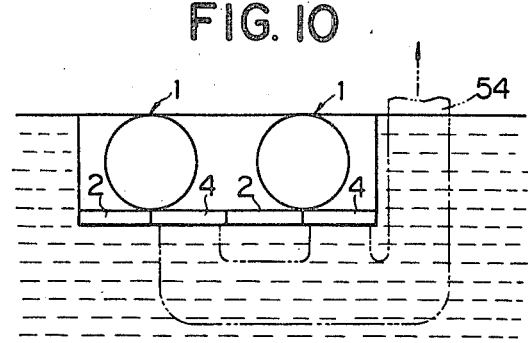

WATER DRIVER POWER SUPPLY SYSTEM

BACKGROUND OF THE INVENTION

This invention relates to water driven power supply system which is installed under water in rivers and produces power by alternately generating buoyancy and gravity by utilization of the difference in the water level between upper and lower streams.

A power system, as a power source for working machines and generators, etc. is required for the power best-suited in keeping with the development of productivity and has been always researched and developed.

There are various power systems; one such system uses kinetic energy and potential energy from wind and water, another uses thermal energy from coal and petroleum, a third uses nuclear energy, etc. The second and third power systems utilizing thermal energy and nuclear energy are being mainly used these days. However, the limits to the safety of the coal, petroleum and uranium, etc. as sources for thermal energy and nuclear energy have been called in question in recent days and, from a viewpoint of energy saving and safety, the power systems using energy from wind or water have been reconsidered and are being studied and developed extensively.

SUMMARY OF THE INVENTION

The present invention is concerned with a power system effectively utilizing the energy from water. A water wheel, as a power unit using energy from water has been used since old times to obtain mechanical energy, while a power generating device which uses water from a dam to drive a generator has been used for a long time to obtain electrical energy.

The invention describes a power system, developed in place of such conventional power systems utilizing the kinetic and potential energies from water, which is installed under water in rivers and intended for producing power by alternately generating buoyancy and gravity by use of the water level difference between upper and lower streams.

The first objective of the invention is to contribute to resource preservation by making good use of energy from water, the second objective is to be able to easily install the system in rivers or the like and use it as a power system either for driving generators or for operating machines and the third objective is to ensure a simple structure of the system and further produce power without failure.

The present invention achieves these objectives by providing a power system which has a water supply port provided with a water supply valve on the bottom of a cylindrical body and a drain port provided with a drain valve are formed, said cylindrical body having mounted freely therein for up and down movements a float which ascends due to buoyancy during water supply by opening/closing the water supply valve and drain valve and descends with dead load at the time of drainage, the upper part of said cylindrical body being provided with a movement conversion mechanism for converting the floating movement at the time of water supply to rotation, in addition said movement conversion mechanism being interlockingly connected to an output mechanism by means of a one-way clutch mechanism transmitting only the rotation movement produced at the time of raising of the float.

BRIEF DESCRIPTION OF THE DRAWING

Drawings show one embodiment of the invention.
FIG. 1 shows a vertical sectional view of the cylindrical body;
FIG. 2 is an explanatory view of the movement conversion mechanism and output mechanism;
FIG. 3 is an explanatory view of the valve opening/closing mechanism;
FIG. 4 is an enlarged view of an operating lever forming part of the valve opening/closing mechanism;
FIG. 6 is a front view of another embodiment;
FIG. 7 is a sectional view one line VII—VII of FIG. 6;
FIG. 8 is an explanatory view of the operation of the embodiment of FIG. 6;
FIG. 9 is a side view of an installation of the water power supply system according to the invention;
and
FIG. 10 is a plan view of FIG. 9.

DETAILED DESCRIPTION OF PREFERRED EMBODIMENT

Figure 5:
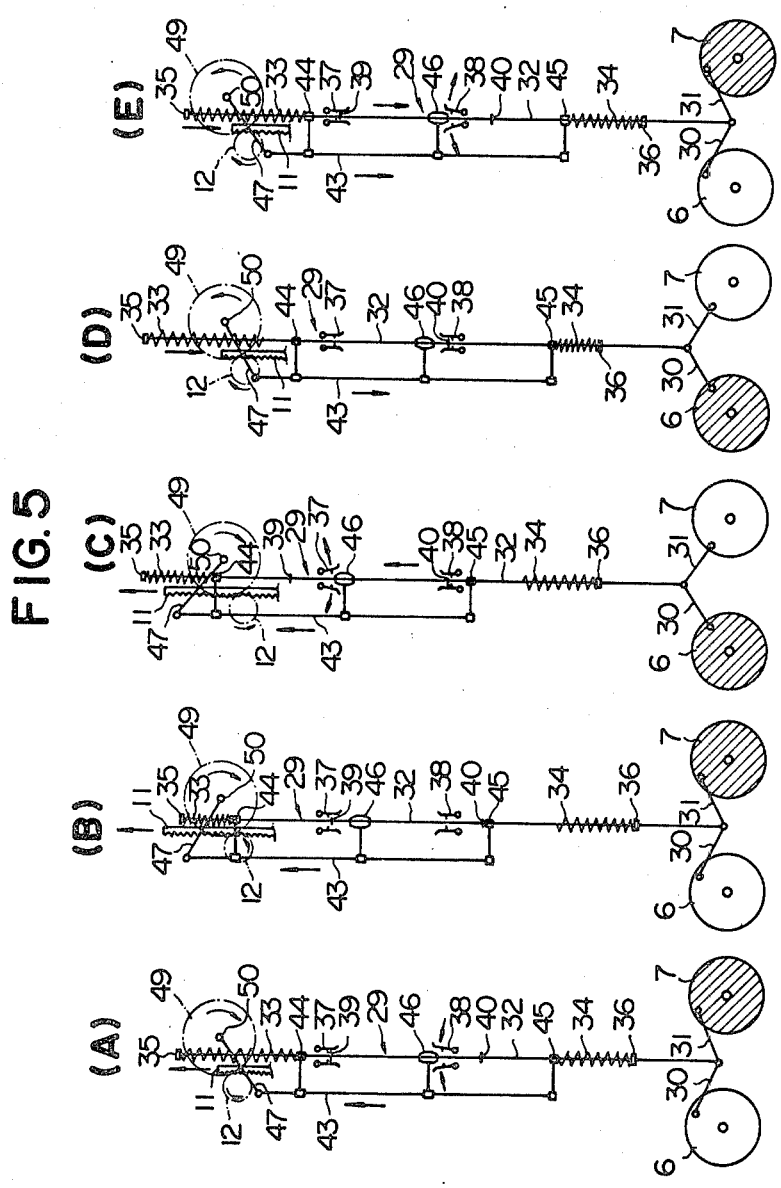
FIGS. 5A-5E are explanatory views of the operation of the valve opening/closing mechanism.

The embodiments of the present invention are explained below reference to the drawings.

A water supply port 3 provided with a water supply valve 2 and a drain port 5 provided with a drain valve 4 are formed at the bottom of a cylindrical body 1. Opening/closing valve plates 6 and 7 are provided on the water supply valve 2 and the drain valve 4 to open and close them by turning. Said cylindrical body 1 has a float 8 therein movable up and down and which ascends by buoyancy at the time of water supply through water supply valve 2 and falls when the drain valve 4 is opened and a stop 9 which limits the lowering of the float 8. The upper part of the cylindrical body 1 includes a movement conversion mechanism 10 which converts up and down movements of the float 8 to rotation, the movement conversion mechanism 10 comprising a rack 11 and pinion 12. As shown in FIGS. 1 and 2, the rack 11 is provided on the upper part of the float 8 extending up in a vertical direction, and the upper part protrudes freely through the top 13 covering the upper part of the cylindrical body 1 and is guided by a guide 14 provided on the top 13. The pinion 12 engaging with the rack 11 is provided on a rotatable shaft 15 positioned over the top 13 and the shaft 15 is turned by the rotation of the pinion 12. In addition, the movement conversion mechanism 10 is interlockingly connected to an output mechanism 17 by means of a one-way clutch mechanism 16 transmitting only the rotation at the time of raising of the float 8. In the movement conversion mechanism 10 and output mechanism 17, as shown in FIG. 2, the one-way clutch mechanism 16 is provided on the shaft 15 turned by the pinion 12 which is a part of the movement conversion mechanism 10; a bevel gear 18 is provided on the end thereof; a bevel gear 20 on the end of a shaft 19 and which is meshed with gear 18 transmits rotation movement to the output mechanism 17.

The output mechanism 17 is, as shown in FIG. 2, provided with a speed change section 25 with a plurality of gears 21, 22, 23 and 24 each having a different diameter and is provided with a pulley 27 and fly wheel 28 constituting output sections which take out the rotation movement transmitted to the output shaft 26.

The cylindrical body 1 includes a valve opening/closing mechanism 29 which closes the water supply valve 2 and opens the drain valve 4 at the upper limit position of movement of the float 8, and opens the water supply valve 2 and closes the drain valve 4 at the lower limit position of movement of the float 8. This valve opening/closing mechanism 29 comprises, as shown in FIG. 3, a link mechanism consisting of levers 30 and 31 which are pivotally mounted at their one ends on the opening/closing valve plates 6 and 7 opening and closing the water supply valve 2 and the drain valve 4, respectively and the other ends of the levers 30 and 31 are pivoted to the lower end of an operating lever 32 movable in up and down directions. The link mechanism is so constructed that the opening/closing valve plates 6 and 7 turn in the opposite directions by up and down movements of the operating lever 32, and the valve plate 6 on the water supply valve 2 turns to the position open the water supply valve 2 and the opening/closing valve plate 7 turns to the position to close the drain valve 4 when the operating lever 32 moves in the down directions, and vice versa. The operating lever 32 is provided with an upper spring 33 at its upper part urging the lever 32 upwardly and a lower spring 34 at its lower part urging the level 32 downwardly; the spring 33 and the spring 34 being supported at their upper end and their lower end, respectively by supporting members 35 and 36 provided on the operating lever 32. The movement of operating level 32 in the upward direction is controlled only by an upward movement regulating unit 37 and movement in downward direction is controlled only by a downward movement regulating unit 38. Said upward movement regulating unit 37 and downward movement regulating unit 38 each have claws 41 engagable in retaining grooves 39 and 40. Said retaining claws 41 are pressed against the operating lever 32 by a spring (see FIG. 4). The operating lever 32 is moved up and down by the up and down movements of an operation rod 43 mounted for movement in the up and down directions. A compression member 44 which contacts the lower end of the spring 33 during upward movement is slidably mounted on the upper part of the operating lever 32 and compresses the spring 33 for producing upward movement accompanying the upward movement of the operation rod 43 and similarly a compression member 45 which contacts the upper part of the spring 34 during downward movement is slidably mounted on the lower part of operating lever 32 and compresses the spring 34 for producing downward movement accompanying the downward movement of the operation rod 43. Furthermore, provided on the operation rode 43 is regulating unit releasing member 46 for freeing the upward movement regulating unit 37 which regulates upward movement of the operating level 32 when the operation rod 43 moves up to a predetermined position and releasing the downward movement regulating unit 38 which controls downward movement of the operating lever 32 when the operation rod 43 moves down to a predetermined position. The operation rod 43 is moved up and down a driving arm 47 which is turned by up and down movements of the float 8. The arm 47 connected with the rack 11 by by a small diameter gear 48 provided on the shaft 15 and a large-diameter gear 49 engaging with the small-diameter gear 48, and the arm 47 is fixed to a shaft 50 on which the large-diameter gear 49 is mounted. The end of the arm 47 has a pin 51 which is engaged in a long hole 52 formed in the upper part of the operation rod 43.

The relationship in position between the regulation releasing unit 46 provided on the operation rod 43 and the upward movement regulating unit 37 and downward movement regulating unit 38 controlling up and down movements of the operating rod 32 is such that the regulation releasing unit 46 provided on the operation rod 43 moved in the upward direction by the arm 47 turning in the upward direction during the raising of the float 8, at the time the float 8 reaches the upper limit position, releases the upward movement regulating unit 37, and when the float 8 reaches the lower limit position the regulation releasing unit 46 releases the downward movement regulating unit 38. The valve opening/closing mechanism 29 as thus constructed is covered with a cover 53 (see FIG. 6) provided on the cylindrical body 1.

Next, the relationship between the up and down movements of the float 8 and the opening/closing operation of the water supply valve 2 and the drain valve 4 is explained with reference to FIGS. 5A–5E.

FIG. 5A illustrates that when the operating lever 32 is in the lower position, the opening/closing valve plate 6 opens the water supply valve 2 and the opening/closing valve plate 7 closes the drain valve 4. Under such condition, water is supplied to the cylindrical body 1 and the float 8 rises and the arm 47 is turned upward accompanying the rising of the float 8 and causes the operation rod 43 to move upward, and the compression unit 44 provided on the operation rod 43 moves in the upward direction and compresses the spring 33 for upward movement of the operating lever 32. At this time, the upward movement of the operating lever 32 is controlled by the upward movement regulating unit 37 and the lever 32 is in lower position (see FIG. 5B). When the float 8 reaches the upper limit position due to continuous water supply, the regulation releasing unit 46 provided on the operation rod 43 releases the upward movement regulating unit 37, the operating lever 32 moves upward by the action of the compressed spring 33 which has been compressed by the compression unit 44, the opening/closing valve plate 6 closes the water supply valve 2 and the opening/closing valve plate 7 opens the drain valve 4 (see FIG. 5C). In this condition the water supply to the cylindrical body 1 is stopped, water in the cylindrical body 1 is drained through the drain valve 4 and the float 8 falls. During the lowering of the float 8, the arm 47 turns in the downward direction to let the operation rod 43 move downward and the compression unit 45 provided on the operation rod 43 compresses the spring 34 for downward movement of the operating lever 32. At this time, the downward movement of the operating lever 32 is controlled by the downward movement regulating unit 38 and the operating lever 32 is in the upper position (see FIG. 5D). By the continuous drainage, the float 8 reaches the lower limit position, and the regulation releasing unit 46 provided on the operation rod 43 releases the downward movement regulating unit 38, the operating lever 32 released from downward movement regulation moves downward by the force of the compressed spring 34 which has been compressed by the compression unit 45, the valve plate 6 opens the water supply valve 2 and the valve plate 7 closes the drain valve 4 (see FIG. 5E). Then the condition shown in FIG. 5A is repeated and water supply to the cylindrical body 1 restarts, thus repeating the operations shown in FIGS. 5A to 5E. As described above, automatic and continuous opening/closing of the water supply valve 2 and the drain valve 4 are repeated alternately and the float 8 also repeats up and down movements.

As described above, the float 8 in the cylindrical body 1 is raised by opening the water supply valve 2 and closing the drain valve 4 and falls during drainage, and the up and down movements of the floats are converted to rotation by the movement conversion mechanism 10 and the rotation is converted by means of the one-way clutch mechanism 16 at the time of raising of the float 8 and transmitted to the output mechanism 17, thus obtaining power from the output mechanism 17.

The above-described embodiment has been disclosed as having one cylindrical body 1. However an embodiment can be provided in which two cylindrical bodies 1 are used. This embodiment is described below.

In this case, each movement conversion mechanism 10 of similarly-constituted cylindrical bodies 1 is interlockingly connected to the output mechanism 17 by means of a one-way clutch mechanism 16 and individual rotation movement from the movement conversion mechanisms 10 at the time of raising of the floats 8 is transmitted to the output mechanism 17 in the same direction (see FIGS. 2 and 6).

The opening/closing operation of the water supply valves 2 and the drain valves 4 of each cylindrical body 1 mounted in parallel is set so that the water supply valve 2 of one cylindrical body 1 opens and the drain valve 4 closes, and the water supply valve 2 of the other cylindrical body 1 closes and the drain valve 4 opens. Therefore, when the float 8 incorporated in one cylindrical body 1 is rising, the float 8 incorporated in the other cylindrical body 1 is falling (see FIG. 8). Accordingly, when two cylindrical bodies 1 are mounted in parallel, the rotation movement at the time of rising of each float 8 is alternately and continuously transmitted to the output mechanism 17 and continuous power is obtained from the output mechanism 17.

The water power supply system according to the invention preferably has the drain valve 4 with the drain pipe 54 shaped for installation in rivers or the like (see FIGS. 9 and 10).

As described above, in the invention the water supply port provided with the water supply valve and the drain port provided with the drain valve are formed on the bottom of the cylindrical body, said cylindrical body having a float mounted therein for freely moving up due to its buoyancy at the time of supplying water by opening the water supply valve and closing the drain valve, and moving down due to its weight at the time of drainage, the upper part of said cylindrical body being provided with the movement conversion mechanism converting the movement of the float at time of supply to rotation said movement conversion mechanism being connected to an output mechanism by means of a one-way clutch mechanism transmitting only the rotation movement obtained at the time of rising of the float. The power can be obtained by alternately carrying out raising of the float by its buoyancy at the time of water supply and lowering of the float due to its weight at the time of drainage. The water power supply system according to the invention, wherein the energy from water is used for generation of power, can contribute to resource saving, is easy to install in rivers or the like, can be used as a power unit for driving generators or for driving machines, and not only has a simple structure but also ensures constant power.

What is claimed is:
1. A water driven power system comprising:

at least one cylindrical body having a water supply port provided with a water supply valve and a drain port provided with a drain valve and located in the bottom of said cylindrical body, said valves including valve plates rotatable between valve open and valve closed positions;

a float freely movable up and down between an upper limit position and a lower limit position in said cylindrical body due to buoyancy during supply of water through said supply valve and due to gravity during drainage through said drain valve;

a movement conversion mechanism on the upper part of said cylindrical body for converting the float movement during the time water supply to rotation;

an output mechanism;

a one-way clutch mechanism connected between said conversion mechanism and said output mechanism; and a valve opening and closing mechanism on the cylindrical body for closing the water supply valve and opening the drain valve at the upper limit position of the float and opening the water supply valve and closing the drain valve at the lower limit position of the float, said valve opening and closing mechanism having a linkage connected to the respective ones of said valve plates and movable up and down for moving said valve plates in rotation for closing the drain valve and opening the supply valve at the lower extremity of movement of said linkage and for opening the drain valve and closing the supply valve at the upper extremity of movement of said linkage, spring means connected to said linkage and compressible for driving said linkage in the upward and downward direction, regulating means for respectively preventing downward and upward movement of said linkage until the said regulating means is actuated, and operating means connected to said movement conversion mechanism and reciprocally operable during the upward and downward movement of said float for compressing said spring means and then actuating said regulating means for releasing said linkage for upward movement under the drive of the compressed spring means, and for compressing said spring means and then actuating said regulating means for releasing said linkage for downward movement under the drive of the compressed spring means.

2. A water driven power system as claimed in claim 1 in which said linkage comprises a pair of levers respectively having the one ends thereof connected to the respective ones of said valve plates, an operating lever to the lower end of which the other ends of said levers are connected and movable up and down to move said other ends of said levers up and down for causing the one ends of said levers to move said valve plates in rotation for closing the drain valve and opening the supply valve at the lower extremity of movement of said operating lever and for opening the drain valve and closing the supply valve at the upper extremity of movement of said operating lever, said spring means comprises a lower spring around the lower end of said operating lever and having the lower end connected to said operating lever and an upper spring around the upper end of said operating lever and having the upper end connected to said operating lever, said regulating means comprises downward and upward movement regulating units respectively mounted along said operating lever for respectively preventing downward and upward movement of said operating lever until they are actuated, and said operating means comprises an operating rod extending parallel to said operating lever and having an upper compression member thereon engaged with the lower end of said upper spring and a lower compression member thereon engaged with said lower spring and a regulating unit releasing member thereon positioned along said operating rod between said regulating units, and a driving arm connected to said movement conversion mechanism and to said operating rod for driving said operating rod in vertical movement parallel to said operating lever for, during upward movement thereof, causing said upper compression member to compress said upper spring and then cause said regulating unit releasing member to engage said upward movement regulating unit for releasing said operating rod for upward movement under the drive of the compressed upper spring and for, during downward movement thereof, causing said lower compression member to compress said lower spring and then cause said regulating unit releasing member to engage said downward movement regulating unit for releasing said operating rod for downward movement under the drive of the compressed lower spring.

* * * * *